(12) United States Patent
Hong et al.

(10) Patent No.: US 9,304,598 B2
(45) Date of Patent: Apr. 5, 2016

(54) MOBILE TERMINAL AND METHOD FOR GENERATING CONTROL COMMAND USING MARKER ATTACHED TO FINGER

(71) Applicant: RESEARCH & BUSINESS FOUNDATION SUNGKYUNKWAN UNIVERSITY, Suwon-si (KR)

(72) Inventors: Kwang-Seok Hong, Gwacheon-si (KR); Byung-Hun Oh, Seoul (KR); Kyung-Won Chang, Suwon-si (KR)

(73) Assignee: RESEARCH AND BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 158 days.

(21) Appl. No.: 14/159,496

(22) Filed: Jan. 21, 2014

(65) Prior Publication Data

US 2015/0078617 A1   Mar. 19, 2015

(30) Foreign Application Priority Data

Sep. 13, 2013 (KR) ........................ 10-2013-0110209

(51) Int. Cl.
*G06K 9/00* (2006.01)
*G06F 3/01* (2006.01)
(Continued)

(52) U.S. Cl.
CPC .............. *G06F 3/017* (2013.01); *G06F 3/0304* (2013.01); *G06K 9/00355* (2013.01); *G06K 9/00389* (2013.01); *G06K 9/224* (2013.01); (Continued)

(58) Field of Classification Search
CPC .......... G06K 9/00355; G06K 9/00375; G06K 9/00382; G06K 9/00389; G06K 2209/21; G06T 2207/10024; G06T 2207/30204; G06F 3/017
See application file for complete search history.

(56) References Cited

U.S. PATENT DOCUMENTS

| 2002/0036617 A1* | 3/2002 | Pryor ..................... G06F 3/042 345/156 |
| 2003/0076293 A1* | 4/2003 | Mattsson ........... G06K 9/00335 345/156 |
| 2010/0199232 A1* | 8/2010 | Mistry .................... G06F 1/163 715/863 |

(Continued)

FOREIGN PATENT DOCUMENTS

| KR | 10-2011-0087407 A | 8/2011 | ................ G06T 7/00 |
| KR | 10-2011-0105671 A | 9/2011 | ................ G06F 3/01 |

OTHER PUBLICATIONS

Park, Ji-Young, et al. "Efficient Fingertip Tracking and Mouse Poiinter Conrol for Inplementation of a Human Mouse" Journal of KISS B vol. 29, No. 11 (2002): 851-859.

(Continued)

*Primary Examiner* — Andrew W Johns
(74) *Attorney, Agent, or Firm* — NSIP Law

(57) ABSTRACT

A mobile terminal 200 generating a control command using a marker attached to a finger includes a camera 210 configured to receive a target image including a finger region, a fingertip region detection module 220 configured to detect a finger region in the target image using an image processing technique, and a fingertip region in the finger region, a marker region detection module 230 configured to detect a color marker region attached to the finger in the target image using a color detection technique, a control module 240 configured to operate the fingertip region detection module or the marker region detection module, based on an input from a user, and a coordinate calculation module 250 configured to calculate three-dimensional coordinate values using the fingertip region or the color marker region.

8 Claims, 7 Drawing Sheets
(1 of 7 Drawing Sheet(s) Filed in Color)

(51) Int. Cl.
*H04N 1/60* (2006.01)
*G06F 3/03* (2006.01)
*G06K 9/22* (2006.01)
*G06K 9/62* (2006.01)
*G06T 7/00* (2006.01)

(52) U.S. Cl.
CPC ........... *G06K 9/6252* (2013.01); *G06T 7/0042* (2013.01); *H04N 1/6005* (2013.01); *G06T 2207/10024* (2013.01); *G06T 2207/30204* (2013.01)

(56) References Cited

U.S. PATENT DOCUMENTS

2013/0086531 A1* 4/2013 Sugita .................... G06F 3/017
 715/863
2014/0044342 A1* 2/2014 Hong .................... G06F 3/0304
 382/154

OTHER PUBLICATIONS

Korean Office Action mailed Jun. 20, 2014 in counterpart Korean Application No. 10-2013-0110209 (5 pages, in Korean).

* cited by examiner

FIG. 2
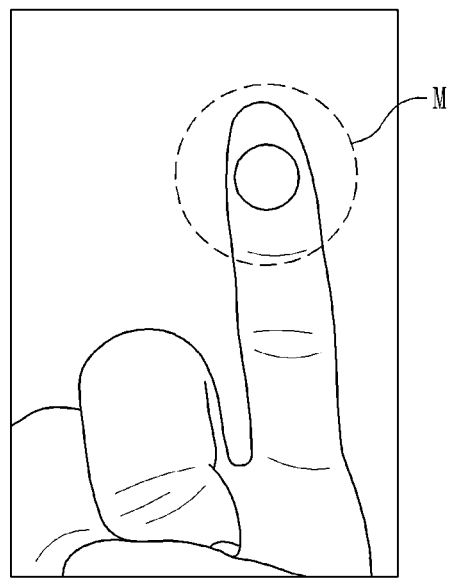
(a)
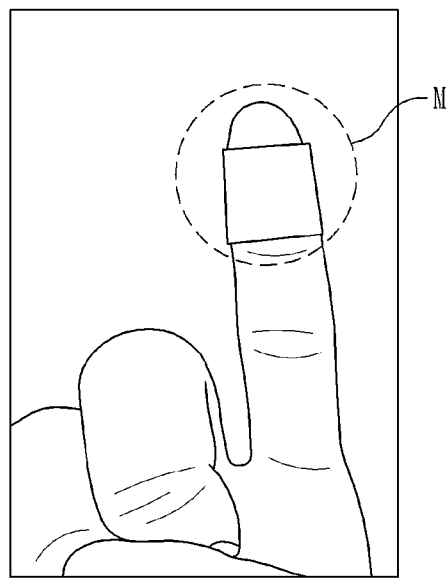
(b)
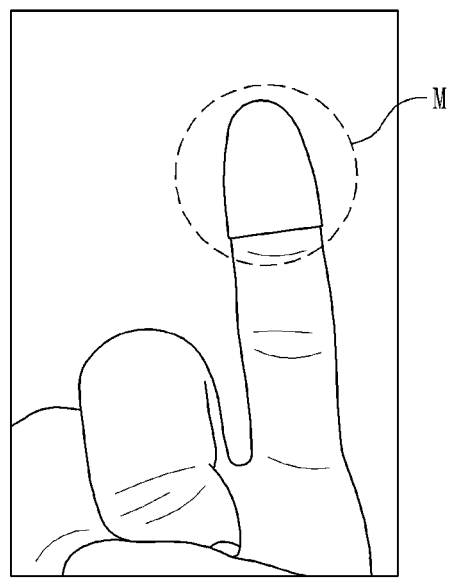
(c)
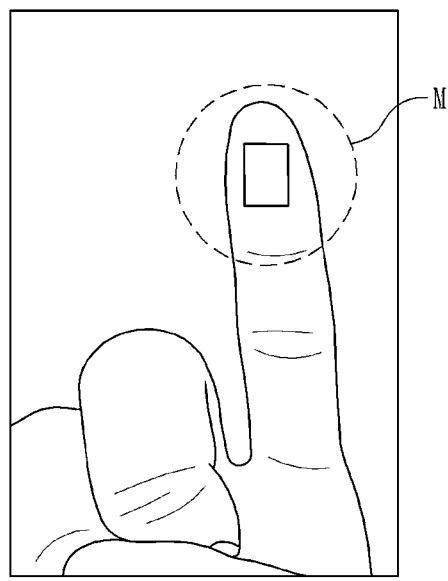
(d)

MOBILE TERMINAL AND METHOD FOR GENERATING CONTROL COMMAND USING MARKER ATTACHED TO FINGER

CROSS-REFERENCE TO RELATED APPLICATION

This application claims priority to and the benefit under 35 U.S.C. §119(a) of Korean Patent Application No. 2013-0110209, filed on Sep. 13, 2013, in the Korean Intellectual Property Office, the entire disclosure of which is incorporated herein by reference for all purposes.

BACKGROUND

1. Field

The following description relates to a mobile terminal generating a control command, such as three-dimensional coordinates, using a finger image input to a camera, and a method of generating a control command in a terminal using a finger image input to a camera.

2. Discussion of Related Art

Recently, as mobile terminals such as smartphones come into wide use, a variety of interface technologies using a touch screen, a sensor, a camera, etc. included in the mobile terminals are being studied.

In particular, a method of using a specific gesture as an interface by analyzing images input to a camera is being widely studied.

SUMMARY

In one general aspect, there is provided a mobile terminal generating a control command using a marker attached to a finger, including a camera configured to receive a target image including a color marker region attached to a finger, a marker region detection module configured to detect the color marker region in the target image using a color detection technique, and a coordinate calculation module configured to calculate three-dimensional coordinate values using the color marker region.

In another general aspect, there is provided a mobile terminal generating a control command using a marker attached to a finger, including a camera configured to receive a target image including a finger region, a fingertip region detection module configured to detect a finger region in the target image using an image processing technique, and a fingertip region in the finger region, a marker region detection module configured to detect a color marker region attached to a finger in the target image using a color detection technique, a control module configured to operate the fingertip region detection module or the marker region detection module based on an input from a user and a coordinate calculation module configured to calculate three-dimensional coordinate values using the fingertip region or the color marker region.

In yet another general aspect, there is provided a method of generating a control command in a terminal using a marker attached to a finger, including receiving, by a terminal, a target image including a finger region to which a color marker is attached from a camera, inputting, by the terminal, a command to use the finger region or a color marker region included in the target image, detecting, by the terminal, a fingertip region in the target region using an image processing technique when the command to use the finger region is input, or detecting the color marker region when the command to use the color marker region is input and calculating, by the terminal, three-dimensional coordinate values using the fingertip region or the color marker region.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 2 shows examples of a marker attached to a finger;

Figure 1:
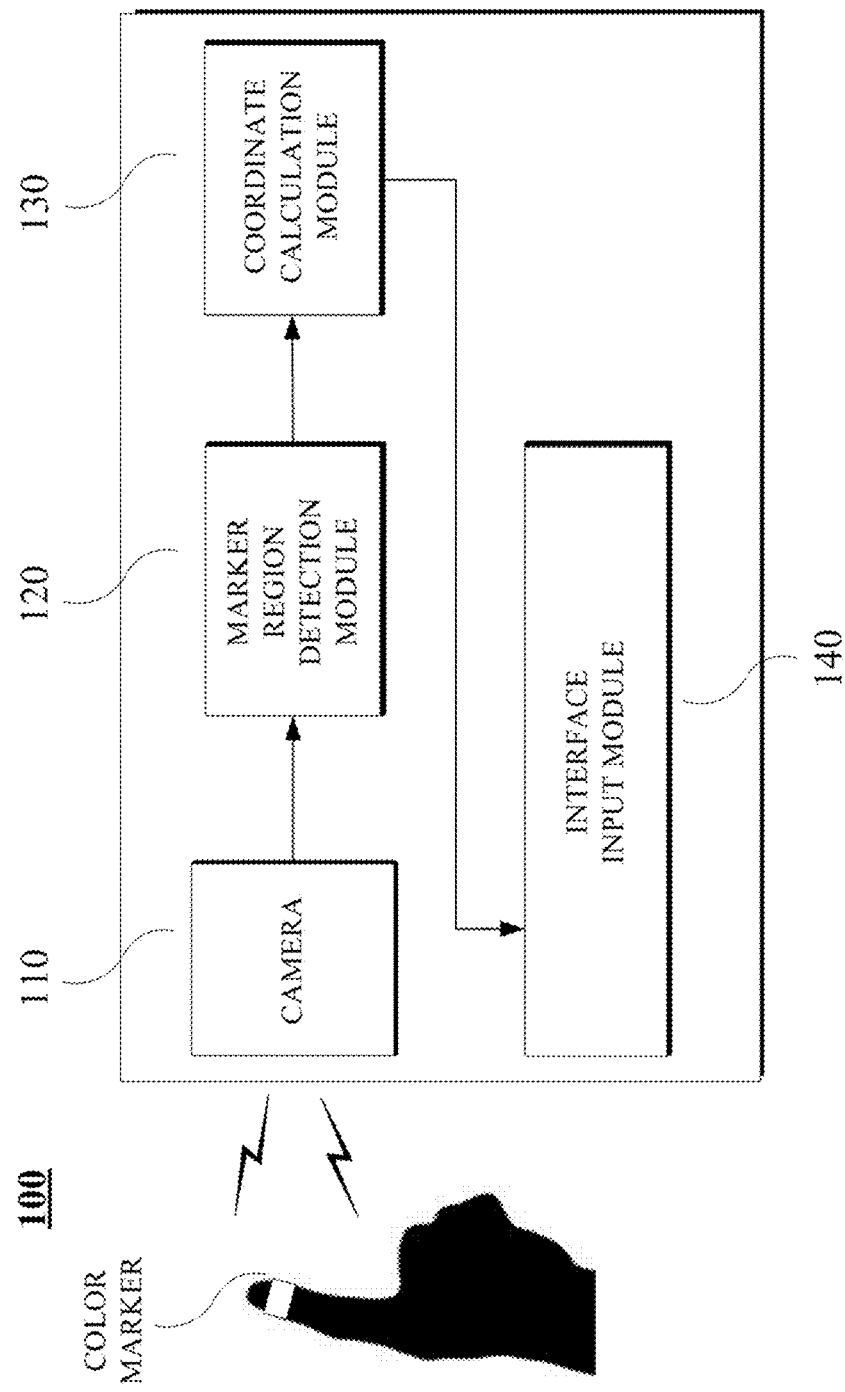
FIG. 1 shows an example of a block diagram illustrating a configuration of a mobile terminal that generates a control command using a marker attached to a finger.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

All terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present example relate to a method of photographing a finger image of a user using a built-in camera in a terminal such as a mobile terminal, and inputting a specific control command (three-dimensional coordinate values, etc.) to a mobile terminal or an application running on the mobile terminal using the photographed finger image. In addition, according to the present example, by detecting a specific region (a color marker region) which is marked with a color marker in a finger image, a specific control command is transferred to a mobile terminal based on the color marker region. In an environment in which a finger is easily detected from an image input to a camera, a control command to control a specific object is generated by detecting a finger region. On the other hand, in an environment in which the finger is not easily detected, the control command to control the specific object is generated by detecting a color marker region.

A control command refers to a command input by a user in an application running on a mobile terminal, etc. For example, the control command may be two-dimensional or three-dimensional coordinate values for controlling a specific object in an application such as a game. In addition, the control command may be an input to select a specific menu in a specific application. The control command normally corresponds to a command to change a location of a specific object.

A target image refers to a source image including a finger image. The target image is photographed using an image capturing apparatus such as a camera. A user runs a specific application on a mobile terminal, and controls movements (coordinates) of a specific object in the application using a finger while watching a display screen on which the application is running. Accordingly, the mobile terminal preferably receives the target image using a camera installed in a direction of the back (a rear) of a display panel. It will be apparent that the target image can be received using a camera installed in a direction of the display panel (a front) of the mobile terminal.

According to the present example, a mobile terminal may refer to a smartphone, a tablet PC, a laptop computer, a portable game machine, a remote controller used in a TV or a game machine, etc. According to the present example, a terminal may refer to a mobile terminal, a normal PC with no mobility, a terminal connected to a server, etc.

Hereinafter, mobile terminals 100 and 200 that generate a control command using a marker attached to a finger, and a method 500 of generating the control command in terminals using the marker attached to the finger will be specifically described with reference to accompanying drawings.

FIG. 1 shows an example of a block diagram illustrating a configuration of a mobile terminal 100 that generates a control command using a marker attached to a finger.

The mobile terminal 100 which generates a control command using a marker attached to a finger includes a camera 110 which receives a target image including a color marker region attached to the finger, a marker region detection module 120 which detects the color marker region in the target image using a color detection technique, and a coordinate calculation module 130 which calculates three-dimensional coordinate values using the color marker region.

According to the present example, a color marker attached to the finger is recognized, and becomes a reference of an interface. The color marker attached to the finger may be preferably a color other than a skin color. A region of the color marker shown in the target image is referred to as a color marker region.

The camera 110 receives a finger image of a user to whom the color marker is attached, and transfers the finger image to the marker region detection module 120.

The marker region detection module 120 may detect the color marker region in the target image using a continuously adaptive mean-shift (CAMshift) algorithm among color detection techniques.

The CAMshift algorithm is a technique improved from a mean-shift algorithm that tracks an object in a region of interest at a high speed, based on a density distribution (feature points, corners, and colors) of a data group. The CAMshift algorithm is a technique that remedies disadvantages of the mean-shift algorithm, using a method of self-adjusting a size of a search window. The CAMshift algorithm predicts and detects a location to be changed using hue value distribution of the region of interest of the object, and then finds a center to trace the object. Further, it is obvious to one skilled in the art that various algorithms besides the CAMshift algorithm may be used to detect the color marker region.

When the marker region detection module 120 detects the color marker region in the target image, the coordinate calculation module 130 may calculate three-dimensional coordinate values using the color marker region.

When the color marker region is designated as the region of interest, the marker region detection module 120 converts a red-green-blue (RGB) image to a hue-saturation-value (HSV) image, generates a base image using maximum frequency characteristics in a histogram for an H channel of the HSV image, generates a mask image by summing results in which threshold values for both of an S channel and a V channel of the HSV image are derived, and detects the color marker region by combining the base image and the mask image. A more specific process will be described later.

An interface input module 140 refers to a module that receives final three-dimensional coordinates calculated by the coordinate calculation module 130. The interface input module 140 is configured to transfer the three-dimensional coordinates to the mobile terminal or an application running on the mobile terminal.

FIG. 2 shows examples of a marker attached to a finger. FIG. 2(a) is an example in which a sticker-type marker is attached to a fingertip, FIG. 2(b) is an example in which a band-type marker is attached to a fingertip, FIG. 2(c) is an example in which a thimble-type marker is attached to a fingertip, and FIG. 2(d) is an example in which a color marker is painted on a fingertip. FIG. 2 merely shows examples of markers which can be used in the present example. Therefore, it is obvious to one skilled in the art that other markers having various colors, sizes, and shapes that are not shown in FIG. 2 may be used. FIG. 2 also shows examples of target images actually input to a camera. In FIG. 2, dashed regions marked M correspond to color marker regions.

Figure 3:
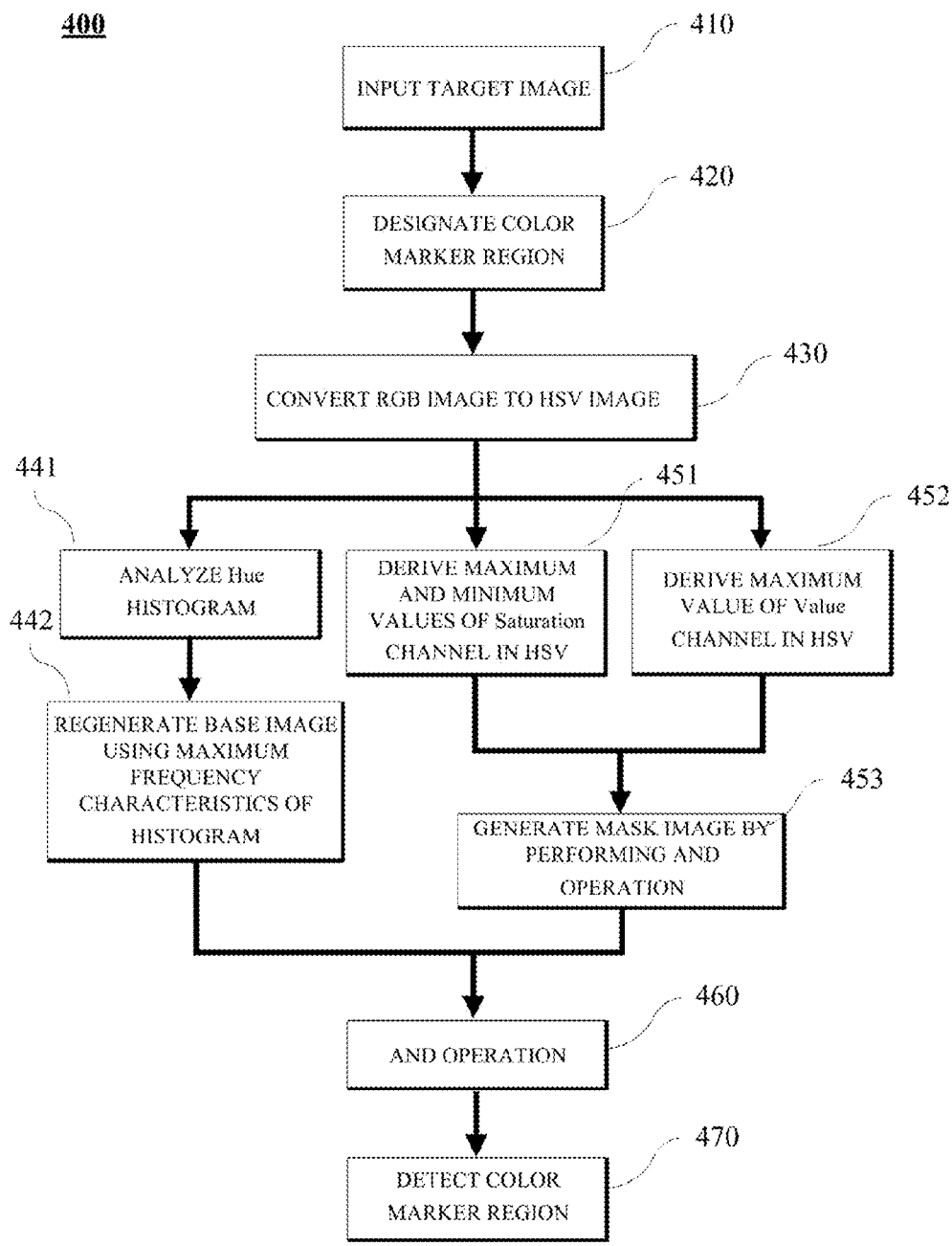
FIG. 3 shows an example of a process of detecting a color marker region using a CAMshift algorithm.

FIG. 3 shows an example of a process 400 of detecting a color marker region using a CAMshift algorithm. The process 400 refers to a process in which the above-described marker region detection module 120 operates.

First, a target image is input from a camera (410). A color marker region in the input target image is designated as a region of interest (420). The region of interest may be designated in such a way that a user selects the color marker region in the target image. For example, when a display device of a mobile terminal is a touch panel, the region of interest may be designated by touching the color marker region. Otherwise, the user may designate the color marker region as the region of interest using a cursor, etc. Further, the color marker region may be automatically output from the target image using an image processing technique.

When the region of interest to be processed is determined, a location to be changed is predicted and detected by performing a color analysis with respect to the region of interest, and a center is found to trace an object. The process is as follows.

An RGB image of the target image input from the camera is converted to an HSV image (430). In this process, the converted HSV image is separated into each of a hue (color) channel, a saturation (chroma) channel, and a value (intensity) channel. In this present example, the saturation channel (S channel) and the value channel (V channel) are used along with the hue channel (H channel) to solve a problem such as overlapping with an object or background having a similar color, which frequently occurs with various motions of the finger, and ensure a powerful tracking performance on variation in the background or illumination.

Next, image processing is performed in each channel. Here, a process in the H channel, a process in the S channel, and a process in the V channel may be performed in any order.

The process in the H channel may include performing an analysis on a histogram for the H channel (441), and regenerating the image using maximum frequency characteristics of the analyzed histogram (442). In this present example, the regenerated image is referred to as a base image.

The processes in the S channel and the V channel may include outputting a maximum value and a minimum value of the S channel using a maximum threshold value and a minimum threshold value in the S channel (451), outputting a minimum value of the V channel using a minimum threshold value in the V channel (452), and generating a mask image by performing an AND operation on the values output from the S channel and the V channel (453). Since the saturation and value channel components are used in addition to the hue information, improvement in color discrimination at a low hue value can be attained with fewer operations.

Next, a final image is generated by combining the base image generated from the H channel and the mask image generated from the S channel and the V channel using an AND operation (460), and the color marker region is detected from the generated final image (470).

Figure 4:
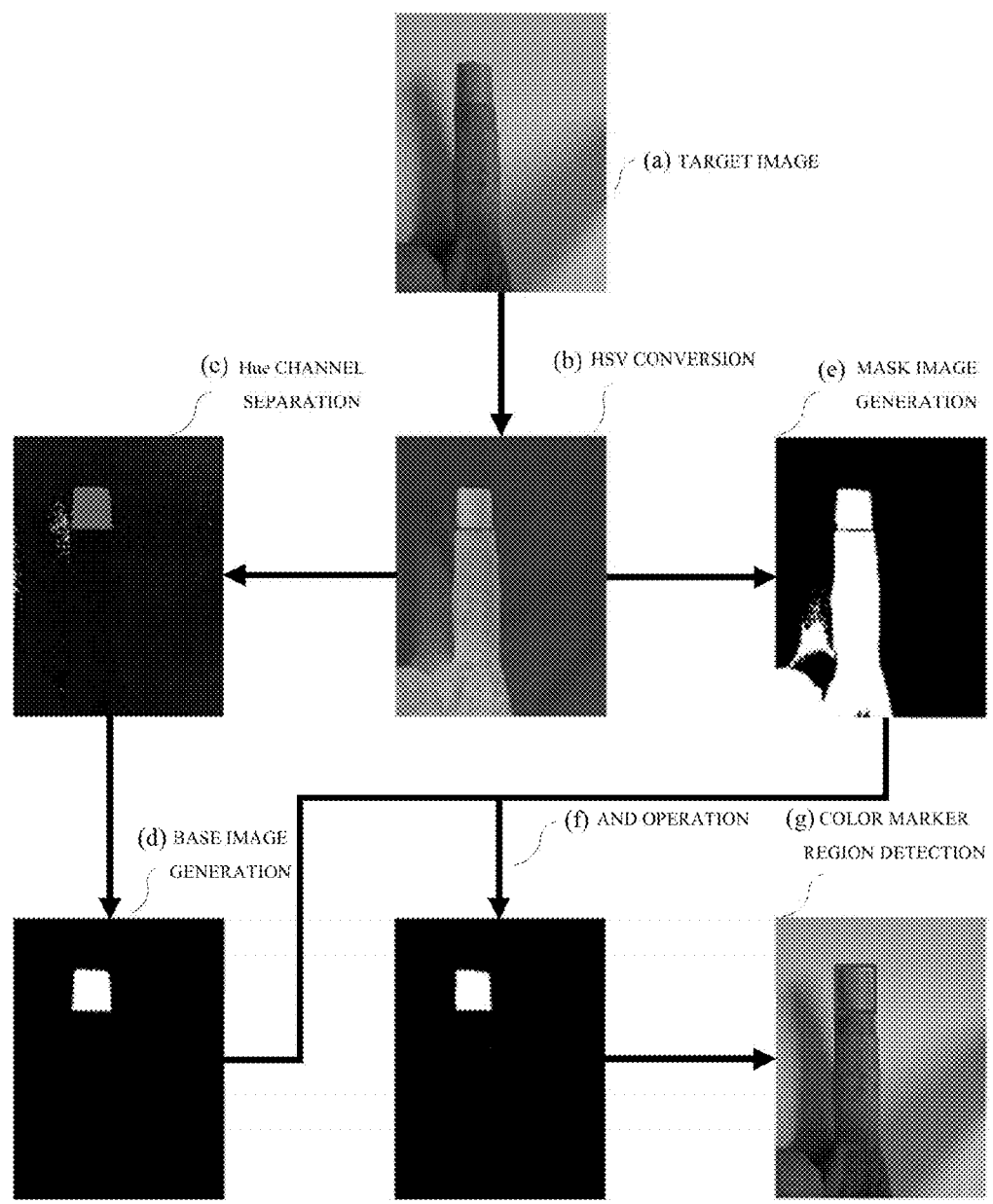
FIG. 4 shows an experimental example in which a color marker region is detected using a CAMshift algorithm.

FIG. 4 shows an experimental example in which a color marker region is detected using a CAMshift algorithm. In FIG. 4, (a) shows a target image including the color marker region, and (b) shows an example of a converted HSV image. In FIG. 4, (c) shows an example in which an H channel is separated from the HSV image, and (d) shows an example in which a base image is generated from the H channel. In FIG. 4, (e) shows an example in which a mask image is generated using an S channel and a V channel separated from the HSV image. In FIG. 4, (f) shows an example in which a final image is generated by performing an AND operation on the base image and the mask image, and (g) shows an example in which a color marker region is detected from the final image.

In a mobile terminal 100 generating a control command using a marker attached to a finger, the coordinate calculation module 130 is configured to generate three-dimensional coordinates using a detected color marker region. The coordinate calculation module 130 estimates X, Y, and Z coordinates using a breadth (width) or a diameter of the detected color marker region. Hereinafter, a process of generating three-dimensional coordinates in the coordinate calculation module 130 will be specifically described.

In this present example, the Z coordinate is estimated using a diameter when the color marker has a circular shape, and using a width or a height when the color marker has a tetragonal shape. When the color marker has a shape other than those shapes, the Z coordinate is estimated using a width or a length of a region capable of being a reference.

When the marker region detection module 120 detects the color marker region, an x coordinate value and a y coordinate value within an image of center pixels of the color marker region may be obtained, and the width or diameter of the color marker region may be obtained. Here, (1) coordinate values represented by uppercase letters, such as X, Y, and Z, refer to coordinate values in a virtual three-dimensional space, which are used in a mobile terminal, etc., and (2) coordinate values represented by lowercase letters, such as x and y, refer to coordinate values based on a location of a pixel in the image.

A distance is estimated using the width or diameter of the detected color marker region, and the Z coordinate is mapped using the estimated distance. The width or diameter of the detected color marker region is estimated using the following Equation 1:

$$FingerPoint.Z = \frac{ColorPoint(\text{cm}) \times PreviewWidth(\text{pixel})}{ColorPoint.Region(\text{pixel}) \times \tan(WidthFOV/2) \times 2} \quad \text{[Equation 1]}$$

wherein ColorPoint is an actual width or diameter of the color marker region, PreviewWidth is a pixel value for a width or diameter to the whole target image input to a camera, ColorPoint.Region is a pixel value for the width or diameter of the color marker region in the target image, and WidthFOV is a horizontal viewing angle of the camera.

For example, the ColorPoint may be 0.5 cm, the PreviewWidth may be 160 pixels, and the WidthFOV may be 62°. When considering various shapes of the color marker, the ColorPoint may be set using a width of a polygon or a diameter of a circle.

The X coordinate is mapped using a center x-pixel coordinate of a detected finger region and the distance estimated from the above Equation 1. First, in order to find the X coordinate, a horizontal length (an X-direction length) obtainable by the camera according to the distance needs to be found. The horizontal length obtainable by the camera may be found from the following Equation 2. The obtainable horizontal length refers to an actual length:

$$FovWidthLength = FingerPoint.Z(\text{cm}) \times \tan\frac{WidthFOV}{2} \times 2 \quad \text{[Equation 2]}$$

wherein FingerPoint.Z is a Z coordinate value calculated in Equation 1, and WidthFOV is a horizontal viewing angle of the camera. For example, the WidthFOV may be 62°.

A distance per pixel may be calculated using a value obtained from Equation 2. An equation for calculating the distance per pixel is as the following Equation 3:

$$DistancePerPixel = \frac{FovWidthLength(\text{cm})}{PreviewWidth(\text{pixel})} \quad \text{[Equation 3]}$$

wherein FovWidthLength is an obtainable horizontal length calculated from Equation 2, and PreviewWidth is a width pixel value of the whole target image input to the camera.

An X coordinate value of the three-dimensional coordinates may be calculated using results of the above equations, as the following Equation 4:

$$FingerPoint.X = ColorPoint.x(\text{pixel}) \times DistancePerPixel(\text{cm}) \quad \text{[Equation 4]}$$

wherein ColorPoint.x is an x-pixel coordinate value for the center pixel of the color marker region in the target image, and DistancePerPixel is a distance value per pixel in a horizontal length direction.

The Y coordinate is mapped using the distance estimated from a center y-pixel coordinate of the detected finger region and the above Equation 1. First, in order to find the Y coordinate, a vertical length (a Y-direction length) obtainable by the camera according to the distance needs to be found. The vertical length caught by the camera may be found from the following Equation 5:

$$FovHeightLength = FingerPoint \cdot Z(cm) \times \tan\frac{HeightFOV}{2} \times 2 \quad \text{[Equation 5]}$$

wherein FingerPoint.Z is a Z coordinate value obtained in Equation 1, and HeightFOV is a vertical viewing angle of the camera. For example, the HeightFOV may be 45°.

The distance value per pixel may be calculated using the value obtained through Equation 5. The distance value per pixel may be calculated using the following Equation 6:

$$DistancePerPixel = \frac{FovHeightLength(cm)}{PreviewHeight(pixel)} \quad \text{[Equation 6]}$$

wherein FovHeightLength is a vertical length obtainable by the camera, and PreviewHeight is a pixel value for a height of the whole target image input to the camera.

The Y coordinate value of the three-dimensional coordinates may be calculated using the values calculated from Equation 5 and Equation 6:

$$FingerPoint.Y = ColorPoint.y(pixel) \times DistancePerPixel \text{ (cm)} \quad \text{[Equation 7]}$$

wherein ColorPoint.Y is a y-pixel coordinate value for the center pixel of the color marker region in the target image, and DistancePerPixel is a distance value per pixel in a vertical length direction.

Likewise, the coordinate calculation module 130 of the mobile terminal 100 which generates a control command using an attached marker may estimate the three-dimensional coordinate values using Equation 1, Equation 4, and Equation 7.

Figure 5:
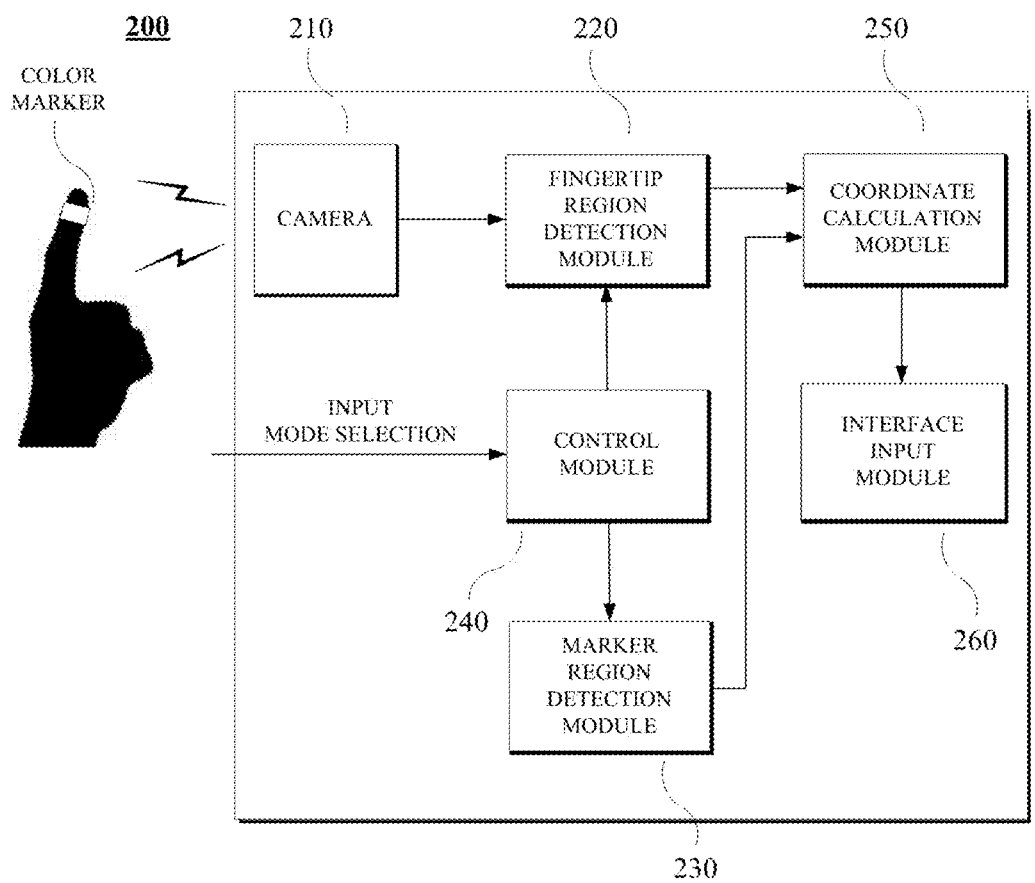
FIG. 5 is another example of a block diagram illustrating a configuration of a mobile terminal that generates a control command using a marker attached to a finger.

FIG. 5 is another example of a block diagram showing a configuration of a mobile terminal 200 that generates a control command using a marker attached to a finger. The mobile terminal 200 described in FIG. 5 may selectively use a configuration in which three-dimensional coordinates are generated using a finger image with no color marker, or a configuration in which three-dimensional coordinates are generated using a color marker.

The mobile terminal 200 that generates a control command using a marker attached to a finger includes a camera 210 which receives a target image including a finger region, a fingertip region detection module 220 which detects the finger region in the target image using an image processing technique and detects a fingertip region from the finger region, a marker region detection module 230 which detects a color marker region attached to a finger in the target image using a color detection technique, a control module 240 operating the fingertip region detection module 220 or the marker region detection module 230 based on an input by a user, and a coordinate calculation module 250 which calculates three-dimensional coordinate values using the fingertip region or the color marker region.

An interface input module 260 has the same configuration as the interface input module 140 of the mobile terminal 100 that generates a control command using the above-described marker attached to a finger.

The fingertip region detection module 220 detects the fingertip region in the target image using a skin color detection technique or an edge detection technique. The marker region detection module 230 may detect the color marker region in the target image using a CAMshift algorithm. The marker region detection module 230 has the same configuration as the marker region detection module 120 of the mobile terminal 100 that generates a control command using the above-described marker attached to a finger.

The fingertip region detection module 220 detects the fingertip region that becomes a reference for estimating a coordinate in the target image. In this process, an Adaboost algorithm may be used.

The control module 240 determines whether to use the fingertip region (a finger mode) or the color marker region (a color marker mode), depending on a mode selection of the user. The user may set the mode using an interface of the mobile terminal.

The mobile terminal 200 that generates a control command using a marker attached to a finger may be operated in the two kinds of modes. In the color marker mode, the coordinate calculation module 250 may calculate a Z coordinate value using at least one of a width, a diameter, a height, and an area of the color marker region, and calculate an X coordinate value and a Y coordinate value by calculating an actual distance which a center pixel of the color marker region travels using the Z coordinate value. This process is the same as the process in the coordinate calculation module 130 of the mobile terminal 100 that generates a control command using the above-described marker attached to a finger.

In the finger mode, the three-dimensional coordinates is calculated based on the fingertip region that is detected by the fingertip region detection module 220. The coordinate calculation module 250 calculates the X coordinate value and the Y coordinate value using a reference point of the fingertip region, and the Z coordinate value using at least one of a width, a height, and an area of the fingertip region.

Figure 6:
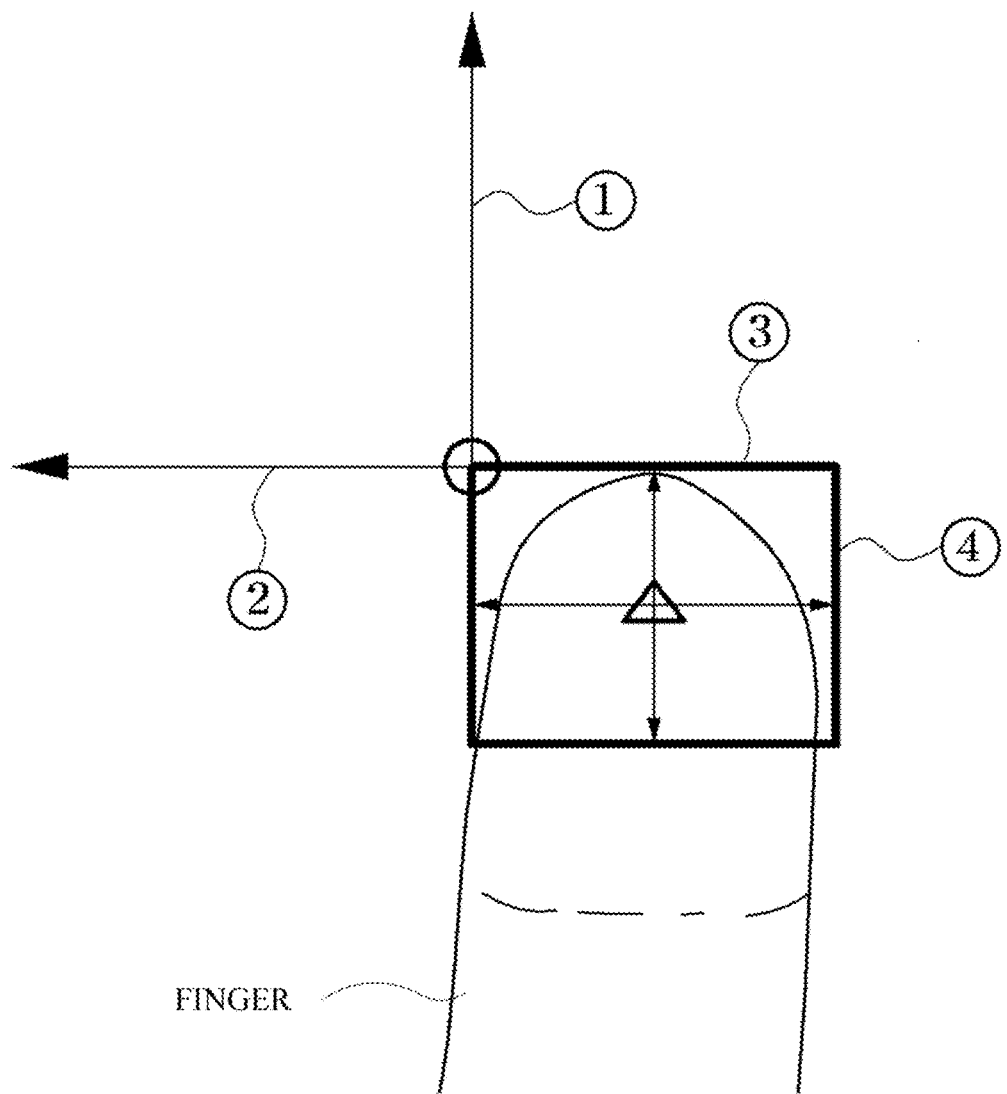
FIG. 6 shows an example of a reference by which a coordinate calculation module calculates a coordinate in the finger mode.

FIG. 6 shows an example of a reference by which the coordinate calculation module 250 calculates a coordinate in the finger mode. In FIG. 6, a region illustrated with a tetragonal box in the center corresponds to the fingertip region. An upper-left edge marked with a circle is referred to as a starting point of the fingertip region. refers to a y coordinate value (a y-axis length) of the starting point of the fingertip region, and becomes a reference for reckoning on what coordinate in the y-axis direction the fingertip region is located in the target image.

refers to an x coordinate value (an x-axis length) of the starting point of the fingertip region. refers to a height of the fingertip region, and refers to a width of the fingertip region. Accordingly, the tetragonal box region represented by and corresponds to the fingertip region. In FIG. 6, the center (a triangle mark) of the tetragonal box is a reference for measuring the three-dimensional coordinate values. Each reference point described in FIG. 6 is a reference for calculating the three-dimensional coordinates, and it is obvious that references disposed at other locations may be used.

In the finger mode using the fingertip region, the three-dimensional coordinate values may be calculated as follows.

An X coordinate value (Finger Point(x)) among the three-dimensional coordinate values may be calculated using the following Equation 8:

$$FingerPoint(x) = FingerRegion \cdot x + \left(\frac{FingerWidth}{2}\right) \quad \text{[Equation 8]}$$

wherein FingerRegion.x is an x coordinate of a starting point of a detected finger region in an input image, and FingerWidth is a width of the detected finger region. First, a middle of the finger region is set by dividing the width (FingerWidth) of the finger region by two. Then, the X coordinate of the finger region in the input image is set by adding the x coordinate (FingerRegion.x) of the starting point of the finger region.

A Y coordinate value (Finger Point(y)) among the three-dimensional coordinate values may be calculated using the following Equation 9:

$$FingerPoint(y) = FingerRegion \cdot y + \left(\frac{FingerHeight}{2}\right) \quad [\text{Equation 9}]$$

wherein FingerRegion.y is a y coordinate of the starting point of the detected finger region in the input image, and FingerHeight is a height of the detected finger region. First, a middle of the finger region is set by dividing the height (FingerHeight) of the finger region by two. Then, the Y coordinate of the finger region in the input image is set by adding the y coordinate (FingerRegion.y) of the starting point of the finger region.

A Z coordinate value among the three-dimensional coordinate values may be calculated as the following Equation 10. A z coordinate value is set using a distance between the camera and the finger (FingertoCameraDistance). The distance between the camera and the finger is estimated using the width of the fingertip region. That is, the distance between the camera and the finger is estimated by comparing a width at a reference distance to the width of the fingertip region being input through the camera. It is obvious that the distance between the camera and the finger may be estimated based on one of the width, the height, and the area:

$$FingertoCameraDistance = \frac{fingerwidth(\text{cm}) \times previewwidth(\text{pixel})}{pixeldistance\ of\ fingerwidth(\text{pixel}) \times \tan(FOV/2) \times 2} \quad [\text{Equation 10}]$$

wherein fingerwidth is an actual width of the finger of the user, and previewwidth is a width pixel value of an image input by a mono camera. FOV (Field of View) is a range of view, which appears when observing a specific point (a fingertip region) from the camera, expressed as an angle. When the distance between the camera and the finger is estimated using Equation 10, a relative location of the z coordinate at which the finger is disposed may be found.

Figure 7:
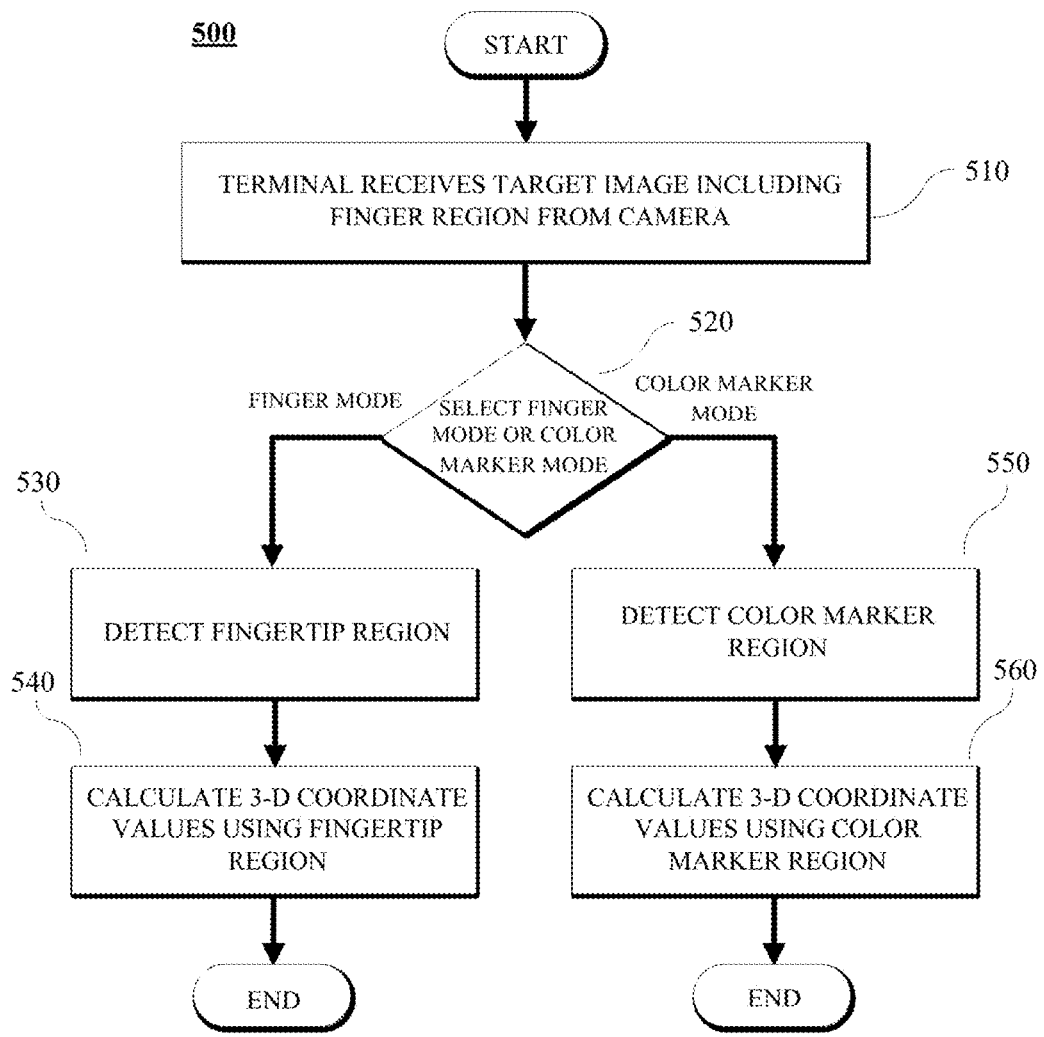
FIG. 7 is an example of a flowchart illustrating a method of generating a control command using a finger in a terminal.

FIG. 7 is an example of a flowchart illustrating a method 500 of generating a control command in a terminal using a finger. According to the present example, the terminal may include the above-described mobile terminal, a normal PC with no mobility, a terminal connected to a server, etc.

The method 500 of generating a control command in a terminal using a finger may include a step 510 in which a target image including a finger region is input to the terminal by a camera, a step 520 in which the terminal inputs a command to use the finger region or a color marker region included in the target image, a step 530 in which, when a command to use the finger region is input, the terminal detects a fingertip region in the target image using an image processing technique, or a step 550 in which, when a command to use the color marker region is input, the terminal detects the color marker region, and a step 540 or 560 in which the terminal calculates three-dimensional coordinate values using the fingertip region or the color marker region.

Step 520 of inputting a command is a step of selecting the finger mode or the color marker mode as shown in FIG. 7. It is preferable to use one of the two modes according to a user's preset settings. Otherwise, when the fingertip region is not detected using the finger mode, the color marker mode may be automatically used.

The command to use the color marker region may be a touch input to the color marker region output from a touch display apparatus of the terminal. The process may be a command to designate a region including the color marker region in the target image to use a CAMshift algorithm.

In the finger mode, step 530 of detecting the fingertip region is the same as the above-described process in which the fingertip region detection module 220 operates. Step 530 of detecting the fingertip region includes detecting the fingertip region in the target image using a skin color detection technique or an edge detection technique. An Adaboost algorithm may be used to detect the fingertip region.

The process of calculating the three-dimensional coordinates is the same as the process in which the above-described coordinate calculation module 250 operates in the finger mode. A specific process is the same as that described in Equation 8 to Equation 10.

In the color marker mode, step 550 of detecting the color marker region includes detecting the color marker region in the target image using a CAMshift algorithm. Step 550 of detecting the color marker region color marker region includes converting an RGB image including the color marker region to an HSV image, generating a base image using maximum frequency characteristics of a histogram for an H channel of the HSV image, generating a mask image by summing results in which threshold values for both of an S channel and a V channel of the HSV image are derived, and generating a final image by combining the base image and the mask image. The process is the same as the process in which the marker region detection module 120 operates, described in FIG. 3.

In the color marker mode, step 560 of calculating the three-dimensional coordinates includes calculating a Z coordinate value using at least one of a width, a diameter, a height, and an area of the color marker region, and calculating an X coordinate value and a Y coordinate value by calculating an actual distance which a center pixel of the color marker region travels using the Z coordinate value. The process is the same as the above-described process in which the coordinate calculation module 130 operates.

According to the present example, a user can recognize a marker attached to a finger, which is input by a camera of a terminal, against a variety of input backgrounds, and use the marker as an interface means.

According to the present example, a user can conveniently input a control command using an application running on a mobile terminal. Further, the present example can be applied to a variety of devices equipped with a camera, such as a remote controller or a controller, as well as the mobile terminal. For example, they can be applied to a controller of a game machine.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of generating a control command in a terminal using a marker attached to a finger, comprising:

receiving, by a terminal, a target image including a finger region to which a color marker is attached from a camera;

inputting, by the terminal, a command to use the finger region or a color marker region included in the target image;

detecting, by the terminal, a fingertip region in the target region using an image processing technique when the command to use the finger region is input, or detecting the color marker region when the command to use the color marker region is input; and calculating, by the terminal, three-dimensional coordinate values using the fingertip region or the color marker region.

2. The method of claim 1, wherein the command to use the color marker region is a touch input to the color marker region output on a touch display device of the terminal.

3. The method of claim 1, wherein in the detecting of the color marker region, the color marker region is detected in the target image using a CAMshift algorithm, and the detecting of the color marker region comprises:

converting an RGB image including the color marker region to an HSV image;

generating a base image using maximum frequency characteristics of a histogram for an H channel of the HSV image;

generating a mask image by summing results in which threshold values for both of an S channel and a V channel of the HSV image are derived; and generating a final image by combining the base image and the mask image.

4. The method of claim 1, wherein the calculating of the coordinate values includes, when using the finger region, calculating an X coordinate value and a Y coordinate value using a reference point of the fingertip region, and calculating a Z coordinate value using at least one of a width, a height, and an area of the fingertip region.

5. The method of claim 1, wherein the calculating of the coordinate values includes, when using the color marker region, calculating a Z coordinate value using at least one of a width, a diameter, a height, and an area of the color marker region, and calculating an X coordinate value and a Y coordinate value by calculating an actual distance which a center pixel of the color marker region travels using the Z coordinate value.

6. The method of claim 1, wherein, when calculating the coordinate values using the color marker region, the terminal calculates a Z coordinate value (FingerPoint.Z) of the three-dimensional coordinate values based on a width or diameter of the color marker region, using the following equation:

$$FingerPoint \cdot Z = \frac{ColorPoint(\text{cm}) \times PreviewWidth(\text{pixel})}{ColorPoint \cdot \text{Region(pixel)} \times \tan(WidthFOV/2) \times 2}$$

(wherein ColorPoint is an actual width or diameter of the color marker region, PreviewWidth is a pixel value for a width of the whole target image input to a camera, ColorPoint.Region is a pixel value for the width of the color marker region in the target image, and WidthFOV is a horizontal viewing angle of the camera).

7. The method of claim 6, wherein, when calculating the coordinate values, the terminal calculates an X coordinate value (FingerPoint.X) of the three-dimensional coordinate values based on the width of the color marker region, using the following equation:

$$FingerPoint.X = ColorPoint.x(\text{pixel}) \times DistancePerPixel \ (\text{cm})$$

(wherein ColorPoint.x is an x-pixel coordinate value for a center pixel of the color marker region in the target image, $$DistancePerPixel = \frac{FovWidthLength(\text{cm})}{PreviewWidth(\text{pixel})},$$

and $$FovWidthLength = FingerPoint \cdot Z(\text{cm}) \times \tan\frac{WidthFOV}{2} \times 2 \right).$$

8. The method of claim 6, wherein, when calculating the coordinate values, the terminal calculates a Y coordinate value (FingerPoint.Y) of the three-dimensional coordinate values based on the width of the color marker region, using the following equation:

$$FingerPoint.Y = ColorPoint.y(\text{pixel}) \times DistancePerPixel \ (\text{cm})$$

(wherein ColorPoint.y is a y-pixel coordinate value for the center pixel of the color marker region in the target image, $$DistancePerPixel = \frac{FovHeightLength(\text{cm})}{PreviewHeight(\text{pixel})},$$

PreviewHeight is a pixel value for a height of the whole target image input to the camera, $$FovHeightLength = FingerPoint \cdot Z(\text{cm}) \times \tan\frac{HeightFOV}{2} \times 2,$$

and

HeightFOV is a vertical viewing angle of the camera).

* * * * *